United States Patent

[11] 3,578,283

| [72] | Inventor | William H. Jones |
| | | Toronto, Ontario, Canada |
| [21] | Appl. No. | 818,889 |
| [22] | Filed | Apr. 24, 1969 |
| [45] | Patented | May 11, 1971 |
| [73] | Assignee | Armstrong Jones Limited |
| | | Toronto, Ontario, Canada |

[54] ARCUATE BLADE GATE VALVE
10 Claims, 4 Drawing Figs.

[52] U.S. Cl. .................................................. 251/31,
222/556, 222/504, 251/60, 251/114, 251/298
[51] Int. Cl. ............................................................ F16k 1/20
[50] Field of Search ........................................... 251/299,
300, 298, 31, 114; 222/556, 504

[56] References Cited
UNITED STATES PATENTS

| 1,907,773 | 5/1933 | Fisher et al. ................ | 222/556 |
| 2,806,489 | 9/1957 | Armstrong .................. | 222/556X |
| 3,097,711 | 7/1963 | Clark............................ | 222/556 |

FOREIGN PATENTS

| 73,990 | 1916 | Switzerland ................. | 222/556 |

Primary Examiner—Arnold Rosenthal
Attorney—Fetherstonhaugh & Co.

ABSTRACT: A gate valve of the type commonly used to control the flow of pulverulent or granular material moving by gravity from hoppers and the like. The valve has an arcuate valve plate and the valve casing is formed with a deflector consisting of an integral inwardly projecting protuberance serving to prevent particles of the granular material from lodging between the inner edge of the valve plate and the opposite wall which might prevent full closure of the valve.

Patented May 11, 1971
3,578,283
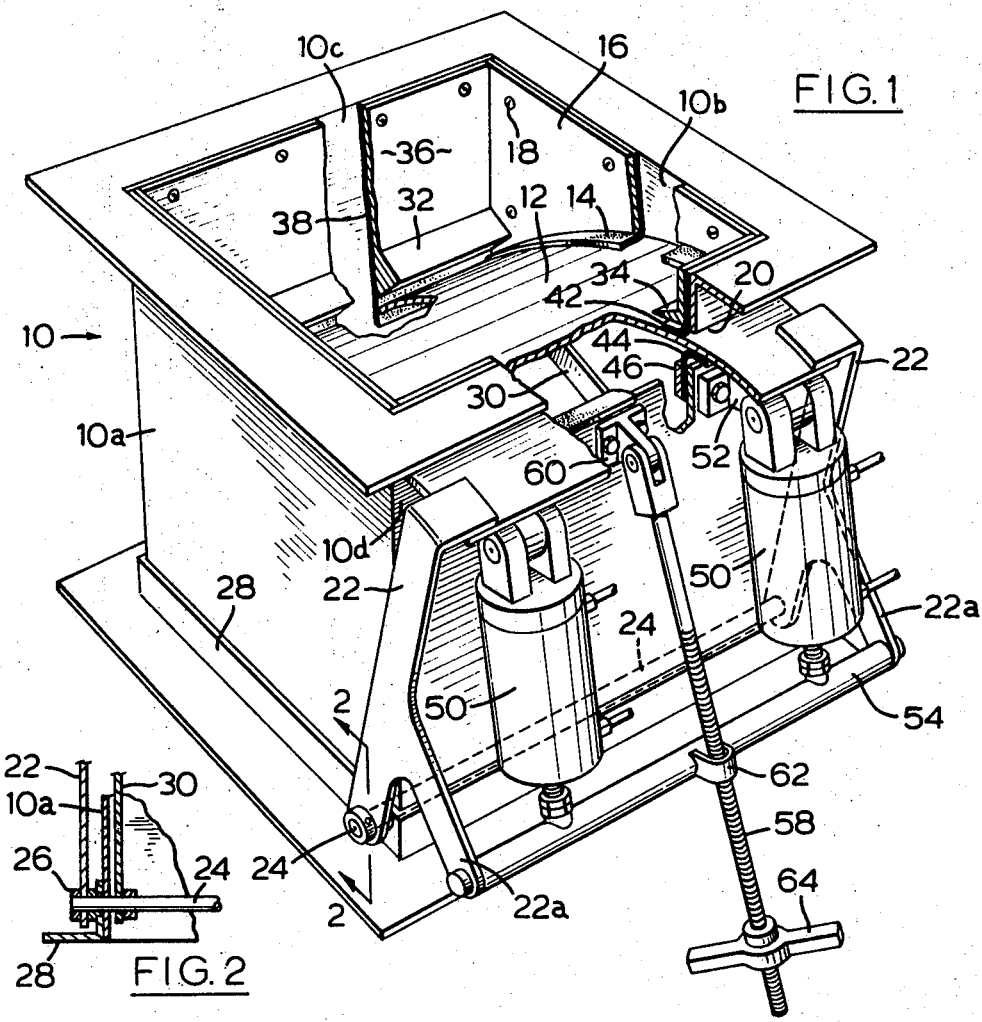
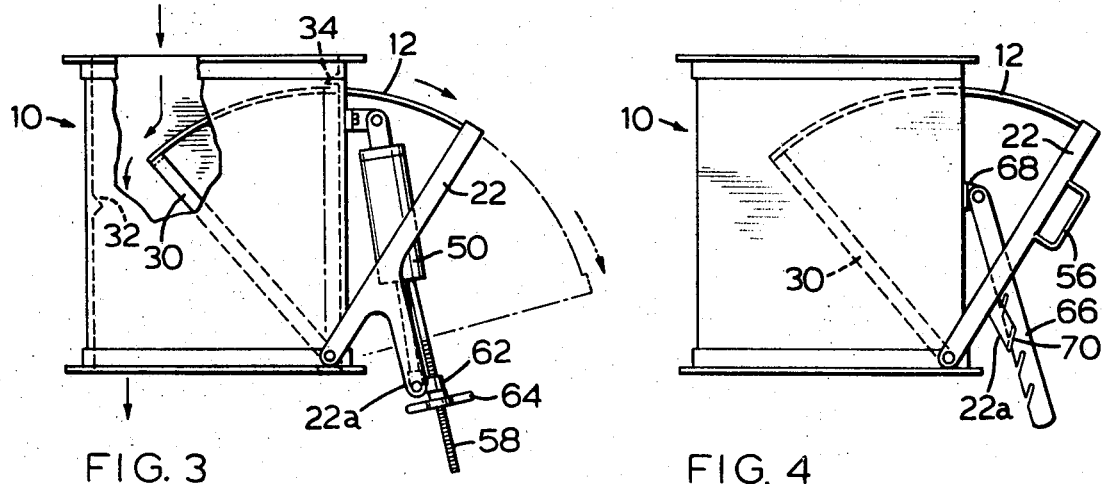
INVENTOR.
WILLIAM H. JONES
BY *Featherstonhaugh & Co.*
ATTORNEYS 3,578,283

ARCUATE BLADE GATE VALVE

FIELD OF INVENTION

This invention relates to gate valves and is particularly concerned with gate valves having arcuate valve plates. The type of gate valve with which the invention is concerned is that type which is used to control the flow of pulverulent or granular materials moving by gravity from hoppers and the like. The term "graunular" is meant to include highly coarse-grained material such as crushed rock and ores, as one of the advantages of the gate valve assembly of the invention is that it includes features which avoid jamming of the valve plate by particularly large particles.

PRIOR ART

The arcuate blade type of gate valve, which is known per se, operates more smoothly than the earlier valves having straight horizontally moving blades, as the latter valves have the drawback that the weight of the material moving through the valve must be supported by the guides in which the valve plate slides. This tends to increase the frictional resistance by the guides on the valve plate making the latter difficult to move. Further, the straight horizontal plate tends to become warped. On the other hand, the arcuate blade type of valve presents a downward sloping surface to the material passing through the valve at all times and avoids the aforementioned difficulties with the straight blade type of valve. Further, a more accurate control on the size of the opening through the valve assembly can be achieved with an arcuate valve plate as the movement of the blade is a pivotable movement.

The arcuate blade type of gate valve assemblied known heretofore have suffered several faults, however. One of the more serious of these faults is that where the valve assembly is used to control the flow of coarse-grained material, the larger particles have tended to become jammed between the leading edge of the valve plate and the adjacent sidewall of the valve casing. This jamming prevents full closure of the valve plate which, under certain circumstances, can be a serious and sometimes dangerous situation.

Another drawback of the known arcuate blade valve assembly is that the blade is carried on arms which are pivotally connected at their lower ends to opposite sides of the valve casing by pivot pins. The use of two spaced pivot pins in this manner has led to misalignment problems as the pins become worn. Still another drawback of the known arcuate blade gate valve is its tendency to leak in the sense that when certain finger grain materials passed through the valve, some of the material is lost.

SUMMARY

The present invention overcomes the difficulties of the prior art by providing a gate valve assembly for controlling the flow of granular material from a hopper or the like, comprising a rectangular valve casing defining a flow passage being open at its upper end to said hopper and having an outlet opening at its lower end, an arcuate valve plate carried in a slot in one side of said casing and adapted to move in and out of said slot to vary the size of said flow passage, a first pair of arm members pivotally fixed at their lower ends to the outside of said casing and fixed at their upper ends to the outer end of said valve plate, said arm members being dimensioned so that rotation thereof about their pivotally fixed lower ends causes said valve plate to move in and out of said slot, means for rotating said arms, and a deflector fixed to the inside of the casing wall opposite the casing wall having said slot and immediately above the line at which the innermost edge of said valve plate contacts said opposite wall, said deflector serving to prevent particles of said granular material from lodging between the inner edge of said valve plate and said opposite wall which might prevent full closure of said valve plate.

It is, therefore, an object of this invention to provide an arcuate blade gate valve assembly having means for preventing jamming of larger particles between the forward or inner edge of the valve plate and the adjacent side of the valve casing.

It is a further object of the invention to provide a gate valve of this type which is provided with means for preventing misalignment of the gate valve and with means for preventing leakage of finer grain materials around the edges of the valve plate.

It is a further object of the invention to provide a gate valve assembly of the type concerned having means for accurately presetting the amount the valve plate can be opened.

The above and further objects of the invention will be more thoroughly understood from the following description of a preferred embodiment thereof as read in conjunction with the accompanying drawings.

In the drawings which illustrate this embodiment of the invention,

FIG. 1 is a perspective view, partly broken away, of an arcuate blade gate valve in accordance with this embodiment of the invention;

FIG. 2 is an enlarged cross-sectional view taken along the line 2–2 of FIG. 1;

FIG. 3 is a side elevation view, partly broken away, of the valve assembly shown in FIG. 1; and FIG. 4 is a view similar to FIG. 3 but showing a modified form of the arrangement for controlling the size of the passage through the valve assembly.

Referring to FIG. 1, the gate valve assembly of the invention essentially consists of a casing 10 defining a flow passageway therethrough and an arcuate valve plate 12 for controlling the size of the passageway. As will be readily understood to those familiar with the uses of valve assemblies of this type, the assembly is fixed to the lower end of a hopper or other vessel for storing pulverulent and granular materials and is used to control the flow of material from the hopper. The materials involved vary widely from extremely fine-grained pulverulent materials such as flour and sugar to medium-grained materials such as grain to relatively coarse-grained materials such as rock and ore.

The materials of which the various components of the valve assembly are made can vary depending upon the intended use of the valve assembly involved but the assembly is most commonly formed of steel which, in the case of the valve assembly for controlling the flow of ores and the like, would be heavy grade steelplate.

In cross-sectional shape, the casing 10 is square or rectangular as it is essential that the sidewalls 10a and 10b be straight as to better effect a seal with the side edges of plate 12. This seal is gained by the use of rubber or the like sheets 14 held in place by liner plates 16 which are fixed to the inside surface of the sidewalls 10a and 10b as by bolts or screws and the like 18. The lower edges of the sheets ride on the top surface of plate 12. The other two walls of the casing 10 are a forward wall 10c and a rear wall 10d, with the terms "forward" and "rear" being adopted having in mind the movements of the valve plate 12 in the sense that the movement which closes the passageway through the casing is towards the wall 10c while the movement which opens the passageway is towards the wall 10d. It will be understood, of course, that the wall 10d contains a horizontal slot 20 adjacent its upper end through which the valve plate moves in the closing and opening actions.

The rear or outer edge of the valve plate 12 is fixed to a first pair of arm members 22 which are connected at their lower ends to a pivot rod 24 which extends through the casing adjacent the lower end thereof and is supported in bearings 26 (SEE FIG. 2) carried in the casing walls 10a and 10b or, as illustrated, in a reinforcing flange 28 extending around the outside of the lower end of the casing. The forward or inner side of the valve plate 12 is, in turn, fixed to a second pair of arm members 30 which are also fixed to the pivot rod 24 at their lower ends but on the inside of the casing.

From the foregoing, it will be appreciated that opening and closing of the valve assembly involves pivoting the arms 22 and 30 with the pivot rod 24 so that the valve plate 12 moves through a circular arc centered at the pivot rod. In this regard it should be noted that heretofore gate valve assemblies of this type while employing arcuate valve plates carried on arms similar to arms 22 and 30, the arms of the known assemblies have been pivotally connected at their lower ends to the sidewalls of the casing only by short pivot pins so that there is a tendency for misalignment which is avoided in accordance with the present invention through the use of the pivot rod 24 which extends right across the casing and ensures against any tendency of the valve plate and its supporting arms to become misaligned.

In order to overcome the fault inherent in known valve assemblies of this type to be jammed by particles of the material moving through the assembly, the present invention provides a pair of deflectors 32 and 34 fixed to the forward and rear casing walls respectively. The deflector 32 is fixed to wall 10c immediately above the line along which the forward edge of the valve plate 12 contacts wall 10c and preferably consists of a cast or forged steelplate 36 carrying the integral outward projecting deflector 32 at its lower end. The deflector prevents an unusually large piece of material from becoming jammed between the forward edge of the valve plate and wall 10c upon closure of the valve plate by deflecting such large piece of material onto the top surface of the plate. Similarly, the deflector 34 deflects any material away from the line along which the top surface of plate 12 moves through slot 20 so that deflector 34 helps to prevent particularly fine pieces of the material from jamming between the top surface of the plate and the upper edge of the slot. It is the deflector 32, however, that has proved most advantageous as there can sometimes be serious and even dangerous consequences as a result of the jamming of large particles between the forward edge of the valve plate and the forward wall of the casing which prevents full closure of the valve plate.

Another drawback of the gate valve assemblies known heretofore is their tendency to "leak," i.e. to permit material to pass the valve plate around its outer edges which contact the casing walls. In accordance with the present invention, this leakage is avoided by the use of rubber or other resilient material seals and wipers and by the use of a durable but resilient liner 38 fixed to the inside surface of forward wall 10c of the casing. The latter liner is held in position against the side of casing wall 10c by the deflector-carrying plate 36. The other sealing elements consist of the resilient material sheets 14, previously mentioned, and similar sheets of resilient material 42 and 44 acting as wiper blades in contact with the upper and lower surfaces of plate 12 where the latter moves through slot 20. Advantageously, the wiper 42 can be held in place by the deflector 34 while a piece of steel strapping 46 is used to hold the wiper 44 in place. The lower wiper 44 is only a preferred expedient for use in gate assemblies controlling the flow of highly pulverulent materials such as paint pigments and the like. The resilient materials selected from these sealing elements can vary depending upon the requirements of resistance to abrasion, corrosion and food sanitation requirements, etc.

The valve assembly of the invention may be provided with either a power or manually operated arrangement for effecting opening and closing of the valve plate. FIGS. 1 and 2 show a preferred power-operated arrangement consisting of at least one but preferably a pair of air cylinders 50 pivotally fixed at their upper ends to the outside surface of casing wall 10d by outwardly projecting mounting brackets 52 and fixed at their lower ends to a crossbar 54 extending between the outer ends of auxiliary arms 22a carried by the arms 22. As will be apparent from FIG. 3, these cylinders open and close the gate valve by working against the auxiliary arms 22a as to pivot the arms 22 and it will be further appreciated that the cylinders are preferably double acting in the sense that air pressure is used to move the contained piston in a positive manner in both directions. Manual operation of the valve plate may be gained through the substitution of a simple handle 56 or the like as shown in FIG. 4.

As the gate valve is used to control the volume of granular material passing through it, it is desirable that it be provided with means for accurately presetting the size of the passageway through the casing. A preferred arrangement for presetting the size of the passageway where the valve is power operated is shown in FIGS. 1 and 3. This arrangement consists of a threaded rod 58 pivotally connected at its upper end to a bracket 60 fixed to the outside of the casing wall 10d and passing through a U-shaped bracket 62 fixed to the crossbar 54. An adjustable screw stop 64 is threaded on the lower end of rod 58. Its longitudinal position on the rod can be adjusted, of course, by threading it up or down the rod and, by presetting its position, one can obtain an accurate passageway size through the casing. As the valve plate 12 is moved outwardly from the casing through slot 20, the crossbar 54 moves downwardly and will eventually contact the screw stop 64 whereupon the valve plate can be no longer moved so that the resultant resistance on the pneumatic system operating the air cylinders 50 can be utilized to interrupt the feed of further air to the cylinders whereby to terminate movement of the valve plate. FIG. 3 shows the U-shaped bracket 62 bearing against the screwnut 54 in the fully opened position of the gate valve according to the preset position of the screw stop 64. Preferably, rod 58 is provided with "square" or other thread designs which are particularly adapted to resist burring, having in mind the manner in which bracket 62 slides up and down the rod at frequent intervals.

An alternative arrangement for presetting the size of openings through the gate valve which is particularly suited to the form of the valve which is manually operated is shown in FIG. 4. This arrangement consists of a slotted bar 66 which is pivotally attached at its upper end to a bracket 68 similar to bracket 60 and which is also attached to the outside surface of casing wall 10d. As shown in FIG. 4, bar 66 is provided with a number of slots in its lower edge which are sized and shaped to engage a modified form of crossbar 70 extending between the outer ends of the auxiliary arms 22a in lieu of the crossbar 54 of the FIG. 1 to 3 embodiment. Upon opening of the valve of FIG. 4, the operator can use the slot and crossbar interaction to accurately set the size of the passageway through the casing.

I claim:

1. A gate valve assembly for controlling the flow of granular material from a hopper or the like, comprising a rectangular valve casing defining a flow passage being open at its upper end to said hopper and having an outlet opening at its lower end, an arcuate valve plate carried in a slot in one side of said casing and adapted to move in and out of said slot as to vary the size of said flow passage, a first pair of arm members pivotally fixed at their lower ends to the outside of said casing and fixed at their upper ends to the outer end of said valve plate, said arm members being dimensioned so that rotation thereof about their pivotally fixed lower ends causes said valve plate to move in and out of said slot, means for rotating said arms, and a deflector fixed to and projecting inwardly from the plane of the inside of the casing wall opposite the casing wall having said slot and immediately above the line at which the innermost edge of said valve plate contacts said opposite wall, said deflector serving to prevent particles of said granular material from lodging between the inner edge of said valve plate and said opposite wall which might prevent full closure of said valve plate.

2. A valve assembly as claimed in claim 1, in which said deflector consists of an integral inwardly projecting triangular in cross section protuberance on the lower end of a liner plate fixed to said opposite casing wall above the line along which the inner end of said valve plate contacts said opposite wall.

3. A valve assembly as claimed in claim 2, further including a second deflector fixed to the casing wall having said slot, said second deflector consisting of a protuberance of triangular cross section extending inwardly from a liner plate fixed to the casing wall, said protuberance being located immediately above said valve plate as to prevent particles of said material from jamming between the upper surface of said valve and the top of said slot.

4. A valve assembly as claimed in claim 3, in which said deflector consists of an integral triangular in cross section protuberance extending inwardly from a linear plate fixed to the casing wall having said slot.

5. A valve assembly as claimed in claim 3, in which the inside surface of said opposite wall of said casing is lined with a tough and resilient liner whereby a tight seal between the innermost edge of said valve plate and said opposite casing wall may be gained.

6. A valve assembly as claimed in claim 5, in which the upper edge of said slot is provided with a wiper of resilient material which bears against the upper surface of said valve plate.

7. A valve assembly as claimed in claim 6, in which the lower edge of said slot is provided with a wiper or resilient material which bears against the lower surface of said valve plate.

8. A valve assembly as claimed in claim 1, including power means for opening and closing said valve assembly, comprising at least one air cylinder pivotally fixed at one end to the outside surface of the slotted wall of said casing and having the outer end of its piston rod fixed to a crossbar extending between a pair of integral auxiliary arms extending outwardly and downwardly from said first pair of arm members whereby operation of said cylinder will cause said arm members and said valve plate to pivot about a pivot axis being coaxial with said pivot rod.

9. A valve assembly as claimed in claim 8, further including means for presetting the amount said arm members may pivot about said pivot axis so that the size of the passageway through said casing may be preset, said presetting means consisting of a threaded rod pivotally attached at its upper end to the outside surface of said slotted casing wall adjacent the upper end thereof and projecting through a U-shaped bracket fixed to said crossbar, and further including an adjustable screw stop threaded on the lower end of said threaded rod whereby it may be manually adjusted relative to said rod.

10. A valve assembly as claimed in claim 1, in which said valve assembly is adapted for manual operation and includes handle means fixed to the outer edge of said valve plate, and further includes means for presetting the amount said arm members may pivot about said pivot axis so that the size of the passageway through said casing may be preset, said presetting means consisting of a bar pivotally fixed at its upper end to the outside surface of said slotted casing wall adjacent the upper end thereof and having a plurality of slots in its lowermost edge and adapted to engage a crossbar extending between a pair of auxiliary arms extending outwardly and downwardly from said first pair of arm members.